Patented Sept. 29, 1953

2,653,865

UNITED STATES PATENT OFFICE 2,653,865

HERBICIDES

Milton Kosmin and Arthur H. Schlesinger, Dayton, Ohio, assignors to Monsanto Chemical Company, St. Louis, Mo., a corporation of Delaware No Drawing. Application August 25, 1950, Serial No. 181,569

5 Claims. (Cl. 71—2.5)

The present invention relates to herbicides and deals more particularly with methods for the general destruction of undesired plants.

A number of herbicides are known, a variety of organic and inorganic compounds having been suggested in the prior art for use as plant-killers. Many of such prior materials have a selective activity, i. e., when employed in certain concentrations they destroy only certain plants without harming adjacent growth of different species. Hence, such herbicides are not of general usefulness and are of little value in clearing large areas such as railway sidings, parking lots, etc. Among other disadvantages of prior herbicides may be mentioned corrosive effect on equipment, water-insolubility (and hence the necessity of flammable organic or obnoxious spray media), chemical reactivity with other components customarily employed in agricultural sprays or powders, instability when exposed for long periods of time to ordinary atmospheric conditions, and soil instability, e. g., chemical reactivity and susceptibility to decomposition of soil microorganisms which results in loss of the active material.

Now, we have found that highly stable, non-corrosive herbicidal compositions are obtained by employing as the active ingredient a benzothiazole compound having the general formula:

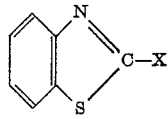

in which X is selected from the class consisting of hydrogen, chlorine and bromine. Compounds having this general formula are benzothaizole. 2-chlorobenzothiazole and 2-bromobenzothiazole.

Compounds having the above general formula are effective herbicides over wide ranges of concentrations. The effectiveness may be measured by determining the inhibition of root growth as compared to similar untreated plants. The general usefulness of a herbicide may be measured by comparing the concentrations of a herbicide required to produce a certain inhibition on a broad-leafed plant with the concentrations of a herbicide required to produce the same inhibition on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following examples:

Example 1

Seventy-five seeds are placed on filter paper in petri dishes and germinated in the presence of water or dilute aqueous solution of the chemical in the dark at 75° C. The average growth of the primary root is then measured and compared with controls growing in contact with pure water. The per cent of normal growth of cucumber seeds was measured for each of the following compounds at the aqueous concentrations indicated below:

|  | Percent growth at 100 parts per million |
|---|---|
| Benzothiazole | 28 |
| 2-Chlorobenzothiazole | 8 |

The herbicidal efficiency of the above compounds is remarkable, because as shown in the table given below, all benzothiazole or thiazole compounds do not possess great herbicidal efficiency. When tested as described above, aqueous solutions or suspensions of a random group of such derivatives were found to have the following effects:

|  | Percent growth at 100 parts per million |
|---|---|
| 2-Benzothiazyl disulfide | 95 |
| 2-Mercapto-4-phenylthiazole | 62 |
| 2-Thiazole-2-mercapto-acetic acid | 56 |
| 2-(Vinylmercapto) benzothiazole | 79 |

Example 2

2-chlorobenzothiazole was tested with both cucumber and wheat seeds and the percentage of growth inhibition measured for various concentrations. The concentration of each compound which permitted 20 per cent of normal growth (80 per cent inhibition) was determined for seeds of cucumber and wheat, respectively. The following results, expressed as parts per million of the herbicide, were obtained:

|  | Cucumber | Wheat | Ratio |
|---|---|---|---|
| 2-Chlorobenzothiazole | 26 | 26 | 1 |

The low narrow leaf: broad leaf ratio obtained for 2-chlorobenzothiazole indicates general utility against both types of plants.

The present benzothiazole compounds are preferably applied by spraying an aqueous solution of the same, this method affording an easy and inexpensive way of destroying plant growth. However, benzothiazole and its 2-chloro or 2-bromo derivatives are likewise effective when applied in agricultural dusts; or they may be used with water-insoluble insecticides, fungicides, etc. in customarily employed organic solutions.

The aqueous solutions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

0.1 part to 20 parts of the benzothiazole compound per hundred parts by weight of the carrier may be employed, and in this manner an acre of land may be freed of plants by application of only a few pounds of one of the present herbicides.

What we claim is:

1. A method for the destruction of plants which comprises applying to said plants a toxic quantity of a herbicidal composition containing as the active ingredient a compound selected from the class consisting of benzothiazole, 2-chlorobenzothiazole and 2-bromobenzothiazole, said active ingredient being present in said composition in a quantity which is injurious to said plants.

2. A method for the destruction of plants which includes applying to said plants a toxic quantity of a herbicidal composition comprising a carrier and, as the active ingredient, a compound selected from the class consisting of benzothiazole, 2-chlorobenzothiazole and 2-bromobenzothiazole, said active ingredient being present in said composition in a quantity which is injurious to said plants.

3. A method for the destruction of plants which comprises applying to said plants a toxic quantity of an aqueous solution of a compound selected from the class consisting of benzothiazole, 2-chlorobenzothiazole, and 2-bromobenzothiazole, said compound being present in the solution in a quantity which is injurious to said plants.

4. A method for the destruction of plants which comprises applying to said plants a toxic quantity of a herbicidal composition containing benzothiazole as the active ingredient, said active ingredient being present in said composition in a quantity which is injurious to said plants.

5. A method for the destruction of plants which comprises applying to said plants a toxic quantity of a herbicidal composition containing 2-chlorobenzothiazole as the active ingredient, said active ingredient being present in said composition in a quantity which is injurious to said plants.

MILTON KOSMIN.
ARTHUR H. SCHLESINGER.

References Cited in the file of this patent

UNITED STATES PATENTS

| Number | Name | Date |
| --- | --- | --- |
| 2,468,075 | Jayne et al. | Apr. 26, 1949 |

OTHER REFERENCES

Beilstein's Handbuch der Organischen Chemie, 4th ed., vol 27, pages 43 and 44 (1937).